(12) United States Patent
Eisl et al.

(10) Patent No.: US 10,907,693 B2
(45) Date of Patent: Feb. 2, 2021

(54) CLUTCH UNIT AND MOTOR VEHICLE DRIVE TRAIN HAVING A CLUTCH UNIT OF THIS TYPE

(71) Applicant: MAGNA POWERTRAIN GMBH & CO KG, Lannach (AT)

(72) Inventors: Thomas Eisl, Graz (AT); Daniel Jäger, St. Josef (AT); Mario Tigelhardt, Mooskirchen (AT); Johannes Unterkofler, Stainz (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 61 days.

(21) Appl. No.: 16/313,556

(22) PCT Filed: Jun. 22, 2017

(86) PCT No.: PCT/EP2017/065454
§ 371 (c)(1),
(2) Date: Dec. 27, 2018

(87) PCT Pub. No.: WO2018/007164
PCT Pub. Date: Jan. 11, 2018

(65) Prior Publication Data
US 2019/0195291 A1    Jun. 27, 2019

(30) Foreign Application Priority Data

Jul. 4, 2016   (DE) .................. 10 2016 212 132

(51) Int. Cl.
*F16D 11/14*    (2006.01)
*B60K 23/08*    (2006.01)

(52) U.S. Cl.
CPC ...... *F16D 11/14* (2013.01); *B60K 2023/0858* (2013.01); *F16D 2300/18* (2013.01);
(Continued)

(58) Field of Classification Search
CPC . F16D 2500/10406; F16D 2500/10462; F16D 2500/30401; F16D 2500/30408;
(Continued)

(56) References Cited

U.S. PATENT DOCUMENTS 4,340,133 A    7/1982  Blersch
6,109,411 A *  8/2000  Bigley ............... B60K 17/3515
                                                192/69.41

(Continued)

FOREIGN PATENT DOCUMENTS

DE         2921032 B1   11/1980
DE    102011080522 A1    2/2013
(Continued)

OTHER PUBLICATIONS

International Search Report and Written Opinion dated Sep. 22, 2017 from corresponding International Patent Application No. PCT/EP2017/065454 with English translation of International Search Report.

*Primary Examiner* — Ernesto A Suarez
*Assistant Examiner* — James J Taylor, II
(74) *Attorney, Agent, or Firm* — Dickinson Wright PLLC (57) ABSTRACT

The invention relates to a clutch unit for a motor vehicle, comprising: a clutch, the clutch having an axially stationary, rotatable coupling element with an axially extending toothing, and an axially displaceable, rotatable mating element with an axially extending mating toothing, the mating element being displaceable into a first position and a second position; and a sensor unit, the sensor unit being disposed radially in relation to the axial extension of the toothing of the coupling element such that the sensor unit senses the toothing of the coupling element. When the mating element is in the first position and when it is in the second position, the sensor unit detects a sensor signal via which the rotational speed of the coupling element and the first position of (Continued)

the mating element, the second position of the mating element, or a position of the mating element between the first position and the second position can be determined. The invention also relates to a motor vehicle drive train comprising a clutch unit of this type.

14 Claims, 7 Drawing Sheets

(52) U.S. Cl.
CPC .............. *F16D 2500/30408* (2013.01); *F16D 2500/30415* (2013.01)

(58) Field of Classification Search
CPC ........... F16D 2500/30415; F16D 11/14; B60K 23/08; B60K 2023/0858; F16H 48/24
See application file for complete search history.

(56) References Cited

U.S. PATENT DOCUMENTS

| | | | |
|---|---|---|---|
| 7,729,839 B2* | 6/2010 | Claussen | B60K 17/36 |
| | | | 701/69 |
| 9,080,845 B2* | 7/2015 | Engel | B23Q 17/002 |
| 9,182,012 B2* | 11/2015 | Greiss | B60K 23/08 |
| 9,651,131 B2* | 5/2017 | Raghavan | F16D 27/118 |
| 10,343,519 B2* | 7/2019 | Edelen | B60K 17/165 |
| 2002/0125057 A1 | 9/2002 | Kitai et al. | |
| 2016/0231198 A1* | 8/2016 | Kaess | G01D 5/26 |

FOREIGN PATENT DOCUMENTS

| | | | | |
|---|---|---|---|---|
| DE | 102013221673 A1 | 4/2015 | | |
| DE | 102014012591 B3 * | 10/2015 | | F16D 23/02 |
| WO | WO-2016198510 A1 * | 12/2016 | | F16D 48/06 |

* cited by examiner

CLUTCH UNIT AND MOTOR VEHICLE DRIVE TRAIN HAVING A CLUTCH UNIT OF THIS TYPE

CROSS-REFERENCE TO RELATED APPLICATIONS

This application is a National Stage of International Application No. PCT/EP2017/065454, filed Jun. 22, 2017, which claims the benefit and priority to German Patent Application No. DE 10 2016 212 132.4 filed Jul. 4, 2016. The entire disclosures of each of the above applications are incorporated herein by reference.

FIELD OF THE INVENTION

The present invention relates to a clutch unit for a motor vehicle, comprising a clutch, wherein the clutch has an axially fixed, rotationally movable coupling element with an axially extending toothing and has an axially displaceable, rotationally movable counterpart element with an axially extending counterpart toothing, wherein the counterpart element is displaceable into a first position, specifically a position in which the counterpart element is not connected to the coupling element, and a second position, specifically a position in which the counterpart element is connected in positively locking fashion to the coupling element, and a sensor unit. The invention also relates to a motor vehicle drivetrain comprising a clutch unit of said type.

BACKGROUND OF THE INVENTION

This section provides information related to the present disclosure which is not necessarily prior art.

Clutch units of the abovementioned type are widely used in particular in the automotive engineering industry. Here, sensor units serve for determining clutch-relevant parameters such as the clutch rotational speed and/or the clutch position. Known clutch units generally use two sensor units, wherein one sensor unit detects the rotational movement of a clutch member of the clutch, that is to say the clutch rotational speed, and the other sensor unit detects the axial change in position of a clutch member of the clutch, that is to say the clutch state. The detection of the rotational movement of a clutch member is generally performed by means of a tooth structure formed specifically for the purpose on the circumference of the clutch member, which tooth structure has teeth and spaces which follow one another in alternating fashion in a direction of rotation. Here, in each case one tooth is separated from in each case one space by a tooth flank, and vice versa. In a manner dependent on the detection of the tooth flanks, the sensor unit forms a signal corresponding to the clutch rotational speed. The determination of the position of a clutch member by the second sensor unit is generally performed by means of a travel sensor. The known designs of clutch unit are to be regarded as taking up a large amount of structural space and as being cost-intensive.

SUMMARY OF THE INVENTION

This section provides a general summary of the disclosure, and is not a comprehensive disclosure of its full scope or all of its features.

It is an object of the invention to specify a clutch unit which is distinguished by a compact and cost-reduced construction in relation to the known clutch units. It is also an object of the invention to specify a particularly energy-efficient motor vehicle drivetrain, in particular an all-wheel-drive drivetrain, having a clutch unit of said type.

Said object is achieved by means of a clutch unit for a motor vehicle, comprising a clutch, wherein the clutch has an axially fixed, rotationally movable coupling element with an axially extending toothing and has an axially displaceable, rotationally movable counterpart element with an axially extending counterpart toothing, wherein the counterpart element is displaceable into a first position, specifically a position in which the counterpart element is not connected to the coupling element, and a second position, specifically a position in which the counterpart element is connected in positively locking fashion to the coupling element, and a sensor unit, wherein the sensor unit is, in relation to the axial extent of the toothing of the coupling element, radially arranged so as to register the toothing of the coupling element, wherein the sensor unit, both in the first position and in the second position of the counterpart element, detects a sensor signal by way of which the rotational speed of the coupling element and the first position of the counterpart element, the second position of the counterpart element or a position of the counterpart element between the first position and the second position can be ascertained.

According to the invention, the clutch unit has a clutch and a sensor unit.

The clutch is in the form of a positively locking clutch and, according to the invention, comprises a coupling element and a counterpart element, wherein the coupling element is designed to be axially static and rotationally movable in relation to a longitudinal axis of the clutch, and the counterpart element is designed to be axially displaceable and rotationally movable in relation to the longitudinal axis of the clutch.

The coupling element has a toothing, wherein the toothing extends in an axial direction. The counterpart element has a counterpart toothing, wherein the counterpart toothing extends in an axial direction.

The expression "axial" describes a direction along or parallel to the longitudinal axis of the clutch of the clutch unit.

According to the present invention, the coupling element and the counterpart element are couplable in positively locking fashion—the counterpart element is displaceable axially into a first position and/or a second position.

According to the invention, the first position of the counterpart element corresponds to a position in which counterpart element and the coupling element are not connected to one another in terms of drive, that is to say the clutch is in an open clutch state. The second position of the counterpart element corresponds to a position in which the counterpart element is connected in terms of drive to the coupling element, that is to say the clutch is in a closed clutch state. In the second position of the counterpart element, torque can be transmitted between the coupling element and the counterpart element.

According to the invention, the sensor unit is, in relation to the axial extent of the toothing of the coupling element, radially arranged so as to register the toothing of the coupling element, wherein the sensor unit, both in the first position and in the second position of the counterpart element, detects a sensor signal by way of which the rotational speed of the coupling element and the first position of the counterpart element, the second position of the counterpart element or a position of the counterpart element between the first position and the second position can be ascertained.

The expression "radial" describes a direction normal to the longitudinal axis of the clutch of the clutch unit.

By means of the clutch unit according to the invention, it is possible, with only one sensor unit, to detect the clutch position and the clutch rotational speed in a simple manner, wherein the clutch rotational speed can be determined both in the first position of the counterpart element, that is to say when the clutch is open, and in the second position of the counterpart element, that is to say when the clutch is closed. In this way, it is possible in particular for control of the clutch unit to be simplified. Furthermore, the clutch unit is distinguished by a cost-reduced construction which takes up less structural space.

The second aspect of the invention is achieved by means of a motor vehicle drivetrain comprising a first drivetrain part and a second drivetrain part, wherein the second drivetrain part can be selectively connected in terms of drive to the first drivetrain part, and wherein the second drivetrain part can be selectively at least partially deactivated by way of a clutch unit according to the invention.

The motor vehicle drivetrain according to the invention, in particular an all-wheel-drive drivetrain, comprises a first drivetrain part and a second drivetrain part, wherein the second drivetrain part can be selectively connected in terms of drive to the first drivetrain part. According to the present invention, the second and drivetrain part can be selectively at least partially deactivated by way of a clutch unit according to the invention.

By means of the design of the motor vehicle drivetrain according to the invention, it is possible in particular to realize an energy-optimized and power-optimized all-wheel-drive drivetrain which is distinguished by a reduced number of sensors. In this way, both structural space and costs can be saved.

Refinements of the invention are specified in the dependent claims, in the description and in the appended drawings.

The sensor signal is preferably a sequence of signal pulses which, in the first position, are defined in a manner dependent on structure transitions owing to the toothing of the coupling element and which, in the second position, are defined in a manner dependent on by the positively locking coupling of the toothing of the coupling element and of the counterpart toothing of the counterpart element.

The sensor unit preferably comprises a sensor element.

The sensor element may be designed as a Hall sensor of any type, inductive sensor, magnetoresistive sensor of any type, optical sensor, etc. This list is not exhaustive, but rather is intended merely to mention exemplary embodiments of the sensor element.

DRAWINGS

The drawings described herein are for illustrative purposes only of selected embodiments and not all possible implementations, and are not intended to limit the scope of the present disclosure.

The invention will be described by way of example below with reference to the drawings.

DETAILED DESCRIPTION OF THE INVENTION

Figure 1:
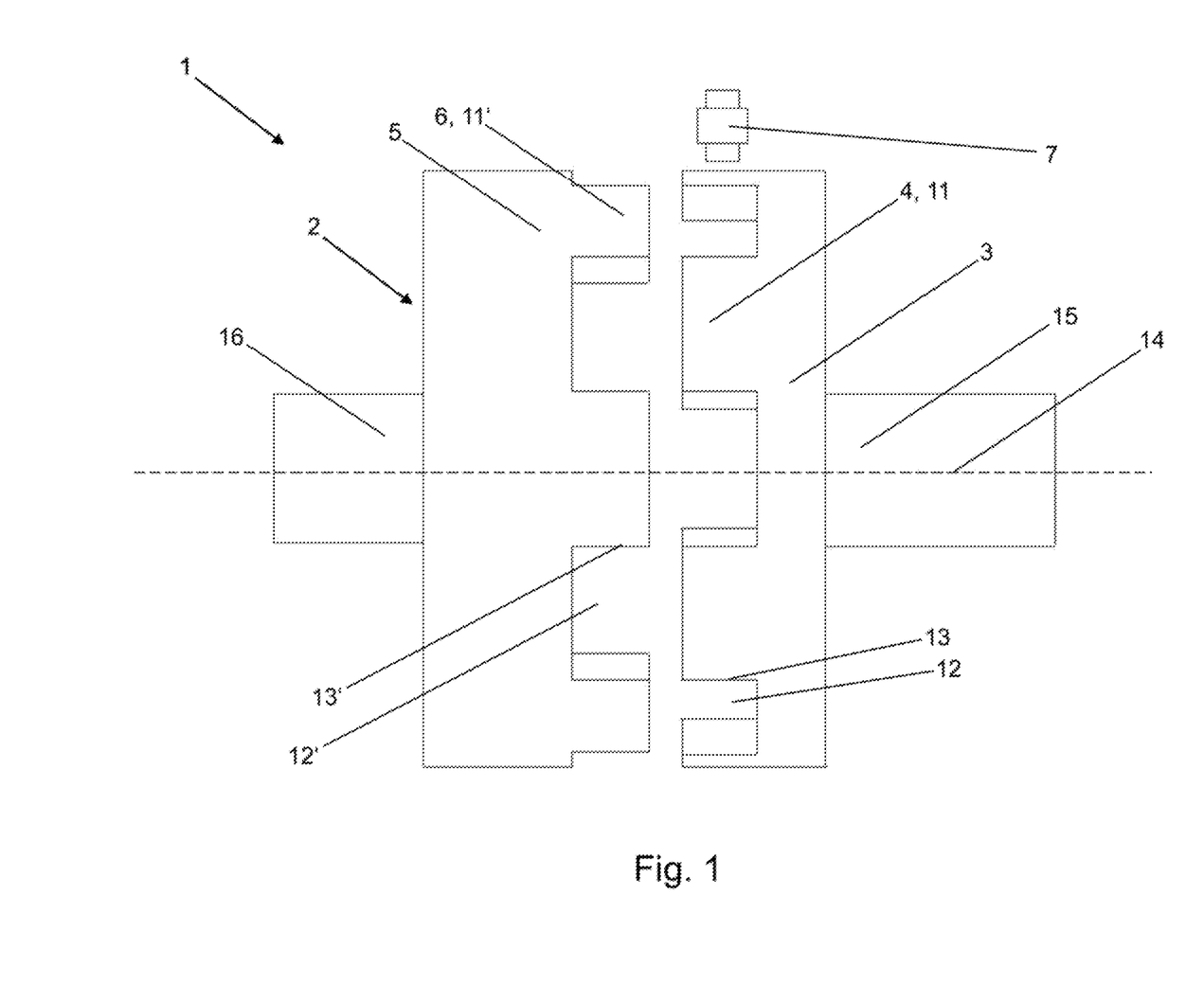
FIG. 1 shows a clutch unit having a clutch whose counterpart element is situated in a first position.
Figure 2:
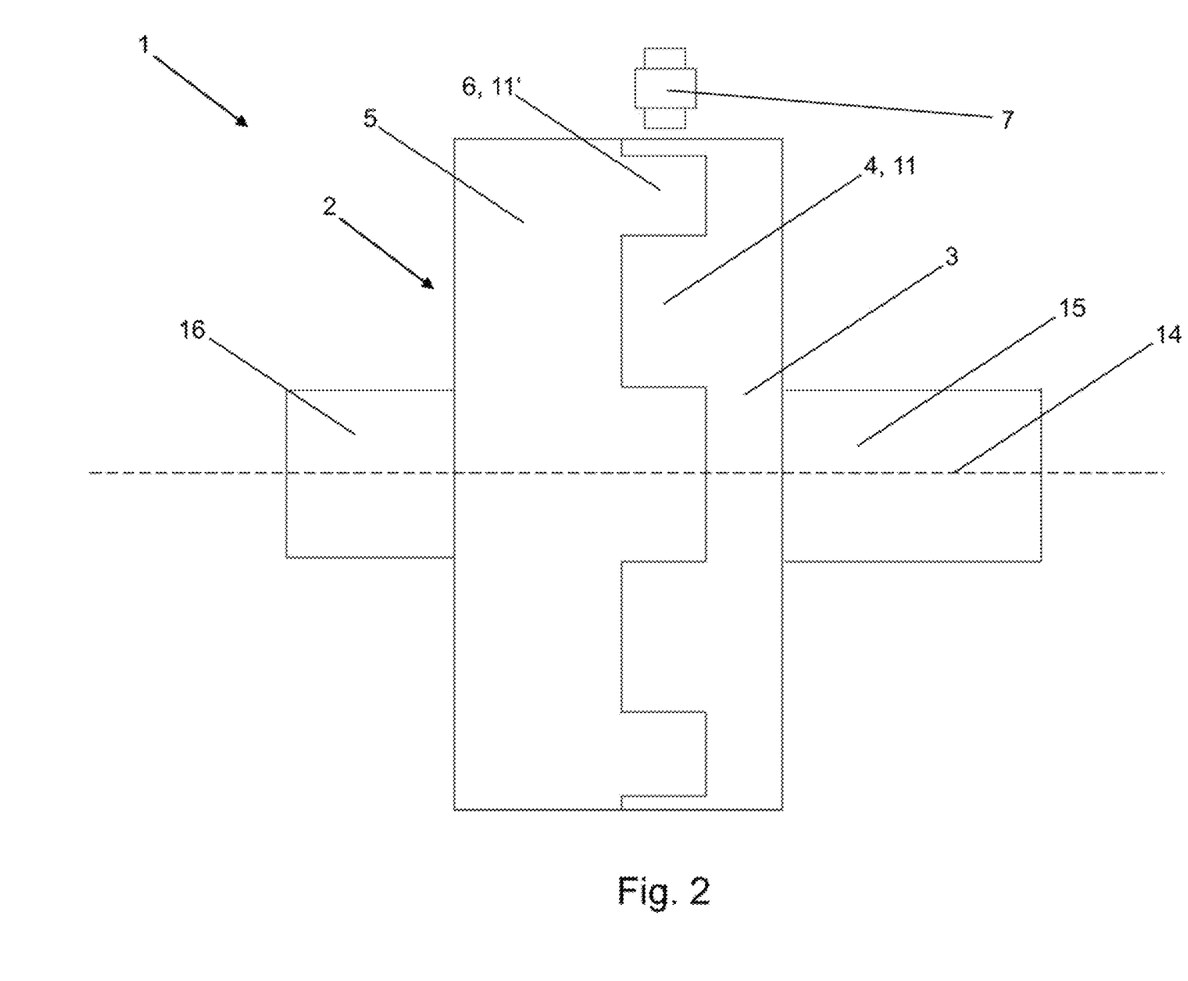
FIG. 2 shows a clutch unit having a clutch whose counterpart element is situated in a second position.

FIG. 1 and FIG. 2 each show a schematic illustration of an exemplary clutch unit 1 according to the invention.

The clutch unit 1 comprises a clutch 2 and a sensor unit 7.

The clutch 1 is designed as a dog clutch and has two clutch members, specifically a coupling element 3 and a counterpart element 5. The coupling element 3 and the counterpart element 5 are designed so as to be couplable to one another in positively locking fashion. The positive locking between the coupling element 3 and the counterpart element 5 is realized by means of a counterpart toothing 6 formed on an end side of the counterpart element 5, which counterpart toothing engages into a toothing 4 of the coupling element 3, which toothing is formed on an end side, facing toward the counterpart toothing 6, of the coupling element 3. The toothing 4 and the counterpart toothing 6 extend in each case in opposite axial directions and each have a multiplicity of teeth 11, 11' and spaces 12, 12'. Here, in each case one tooth 11, 11' is separated from in each case one space 12, 12' by a tooth flank 13, 13' and vice versa. The respective tooth flank 13, 13' between a respective tooth 11, 11' and a respective space 12, 12' and vice versa thus constitutes the structure transition between the structural elements of tooth 11, 11' and space 12, 12'.

The expression "axial" describes a direction along or parallel to a longitudinal axis 14 of the clutch 2 of the clutch unit 1.

By axial displacement of the counterpart element 5 from a first position into a second position, the clutch 2 of the clutch unit 1 is closed, and a torque can be transmitted from the coupling element 3, which is for example coupled to a clutch input side 15, to the counterpart element 5, which is for example coupled to a clutch output side 16, or vice versa.

In the first position of the counterpart element 5, that is to say when the clutch 2 is open, no torque is transmitted from the coupling element 3 to the counterpart element 5 or vice versa.

That is to say, the first position of the counterpart element 5 corresponds to a position in which the counterpart element 5 and the coupling element 3 are not connected to one another in terms of drive. The second position of the counterpart element 5 corresponds to a position in which the counterpart element 5 is connected in terms of drive to the coupling element 3. In the second position of the counterpart element 5, torque can be transmitted between the coupling element 3 and the counterpart element 5.

A position of the counterpart element 5 between the first position and the second position of the counterpart element 5 corresponds to a position in which, during a displacement of the counterpart element 5 from the first position into the second position, a tooth 11 of the toothing 4 abuts against a tooth 11' of the counterpart toothing 6 or vice versa, and thus an engagement of the counterpart toothing 5 into the toothing 3 is not possible.

The sensor unit 7 is arranged so as to detect the toothing 4 of the coupling element 3 radially at the outer side of the toothing 4 of the coupling element 3. In relation to the axial extent of the toothing 4 of the coupling element 3, the sensor unit 7 must be arranged such that the structure transitions of the toothing 4 of the coupling element 3, and of the counterpart toothing 6 of the counterpart element 5 in the event of engagement of the counterpart toothing 6 of the counterpart element 5 into the toothing 4 of the coupling element 3, are uniquely detectable, and thus both the rotational speed of the coupling element 3 and of the counterpart element 5 and also the position of the counterpart element 5 are detectable. The sensor unit 7 preferably senses the toothing 4 of the coupling element 3, and, depending on the position of the counterpart element 5, the counterpart toothing 6 of the counterpart element 5, along a central region of the toothing 4 in relation to the axial extent of the toothing 4. This region detected by the sensor unit 7 constitutes the detection region of the sensor unit 7. A structure transition is to be understood to mean, as viewed in the direction of rotation about the longitudinal axis 14 of the clutch 2, the transition between two adjacent non-identical structural elements of the toothing 4 of the coupling element 3 and/or of the counterpart toothing 6 of the counterpart element 5, specifically of a tooth 11, 11' and a space 12, 12'. For the detection of the rotational speed of the coupling element 3 and of the counterpart element 5 and for the detection of the position of the counterpart element 5, it is thus the case that the toothing 4 and the counterpart toothing 6 of the positively locking clutch 2 are utilized, and there is no need for a measuring structure provided specifically for the purpose to be formed on the circumference of the coupling element 3 and/or of the counterpart element 5. This has a positive influence in particular on the production costs of the clutch unit 1.

The expression "radial" describes a direction normal to the longitudinal axis 14 of the clutch 2.

The sensor unit 7 comprises a sensor element, wherein the sensor element is designed as a Hall sensor, inductive sensor, magnetoresistive sensor of any type, optical sensor, etc.

By means of the sensor unit 7, both in the first position and in the second position of the counterpart element 5, a sensor signal 17 is generated which firstly makes it possible to draw conclusions regarding the rotational speed of the coupling element 3 and/or of the counterpart element 5 of the clutch 2 and secondly makes it possible to draw conclusions regarding the position of the clutch 2.

The sensor signal 17 is a sequence of signal pulses 18 which, in the first position of the counterpart element 5, are defined in a manner dependent on structure transitions owing to the toothing 4 of the coupling element 3 and which, in the second position of the counterpart element 5, are defined in a manner dependent on by the positively locking coupling of the toothing 4 of the coupling element 3 and of the counterpart toothing 6 of the counterpart element 5.

The expression "structure transitions" is to be understood to mean the tooth flanks 13, 13' of the toothing 4 and/or of the counterpart toothing 6 as transitions between a respective tooth 11, 11' and a respective space 12, 12' or vice versa of the toothing 4 and/or of the counterpart toothing 6.

Possible structure transitions that are detectable by means of the sensor unit 7 of the clutch unit 1 are for example the transitions >tooth 11-space 12-tooth 11 etc.< in a first position of the counterpart element 5, >tooth 11-tooth 11'-space 12, 12' possibly reduced depending on tooth clearance-tooth 11-tooth 11' etc.< in a second position of the counterpart element 5 and >tooth 11-tooth 11'< or >space 12-space 12'< in a position of the counterpart element 5 between the first position and the second position of the counterpart element 5.

By means of the sensor signal 17, the rotational speed of the coupling element 3 and the first position of the counterpart element 5, the second position of the counterpart element 5 or a position between the first position and the second position of the counterpart element 5 can be ascertained.

Figure 3A:
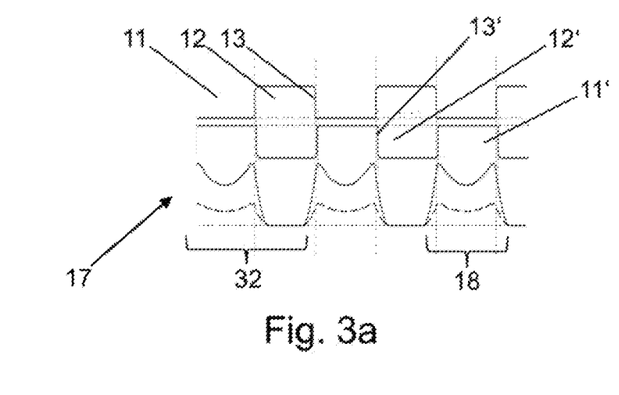
FIG. 3*a* shows a sensor signal of a sensor unit of a clutch unit in the case of a clutch whose counterpart element is situated in a first position.
Figure 3B:
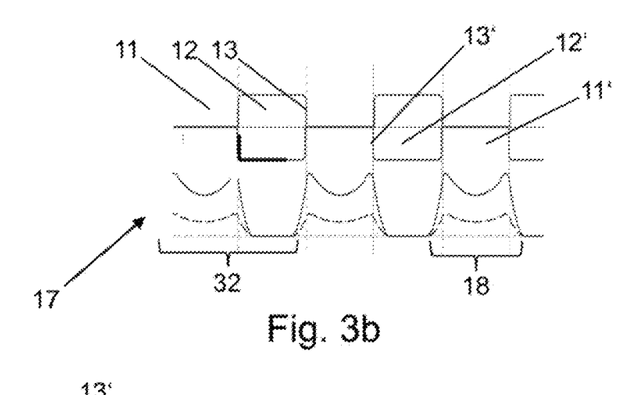
FIG. 3*b* shows a sensor signal of a sensor unit of a clutch unit in the case of a clutch whose counterpart element is situated in a second position.
Figure 3C:
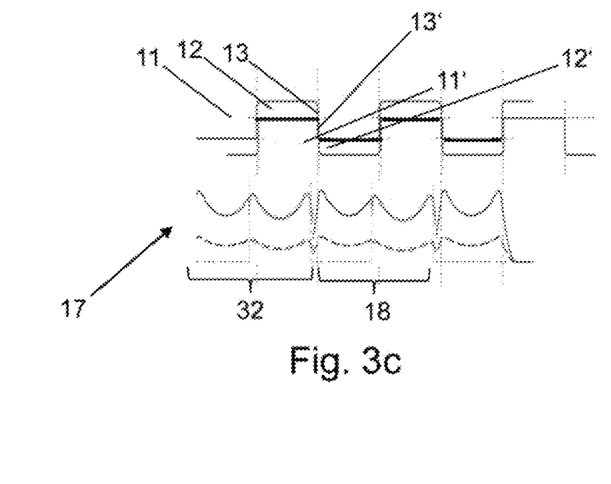
FIG. 3*c* shows a sensor signal of a sensor unit of a clutch unit in the case of a clutch whose counterpart element is situated in a position between a first position and a second position.

FIG. 3a, FIG. 3b and FIG. 3c illustrate examples of a sensor signal 17 which the sensor unit 7 generates in different positions of the counterpart element 5 of the clutch 2, wherein, in each case in the upper region of FIG. 3a to FIG. 3c, the respective >tooth 11, 11'-space 12, 12'< is schematically shown, which corresponds to the respective sensor signal 17 illustrated in the lower region of FIG. 3a to FIG. 3c. FIG. 3a shows an exemplary sensor signal 17 which is generated by the sensor unit 7 when the clutch 2 is open, that is to say with the counterpart element 5 in the first position. FIG. 3b shows an exemplary sensor signal 17 which is generated by the sensor unit 7 when the clutch 2 is not closed, wherein here, the counterpart element 5 is situated in a position between the first position and the second position. FIG. 3c shows an exemplary sensor signal 17 which is generated by the sensor unit 7 when the clutch 2 is closed, that is to say with the counterpart element 5 in the second position.

In FIG. 3a, FIG. 3b and FIG. 3c, the time is plotted in each case on the abscissa, and the signal level of the sensor signal 17 of the sensor unit 7, more specifically of the sensor element of the sensor unit 7, is plotted on the ordinate.

The level of the sensor signal 17 of the sensor unit 7 changes in the event of a structure transition from tooth 11, 11' to space 12, 12' and vice versa. If a tooth 11, 11' is detected, then the sensor signal 17 is high; if a space 12, 12' is detected, then the sensor signal 17 is low. That is to say, when a tooth flank 13, 13' is detected, that is to say a structure transition between a tooth 11, 11' and a space 12, 12' and vice versa, the sensor signal 17 changes from high to low and vice versa.

A period 32 of the sensor signal 17 is the time sequence of >tooth 11, 11'-space 12, 12'<. A signal pulse 18 of the sensor signal 17 is to be regarded as the tooth detection time interval.

The period 32 of the sensor signal 17 is independent of the position of the counterpart element 5 of the clutch 2 and of the rotational speed of the counterpart element 5 and/or coupling element 3.

The tooth frequency is to be understood as the >tooth 11, 11'-space 12, 12'< alternation per unit of time.

The rotational speed of the coupling element 3 can be determined by way of the tooth frequency sensed by the sensor unit 7.

Figure 4:
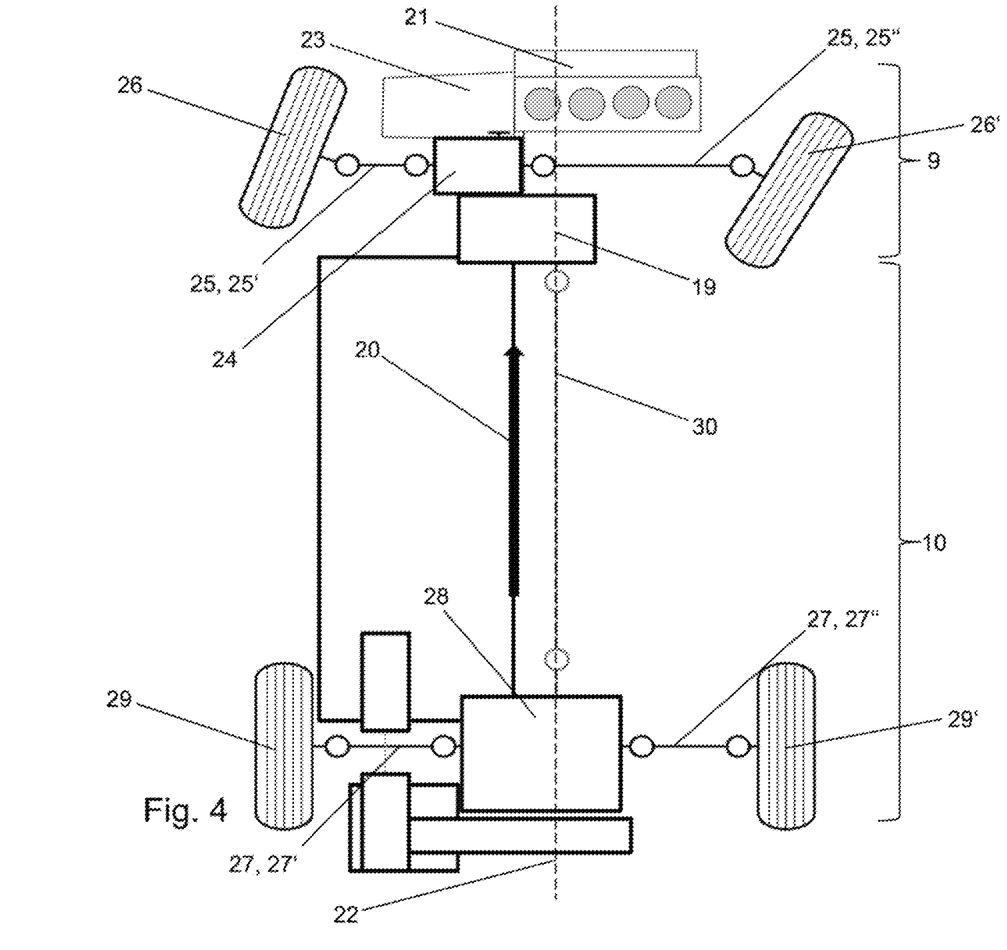
FIG. 4 shows an exemplary motor vehicle drivetrain.

FIG. 4 illustrates an exemplary motor vehicle drivetrain 8, more specifically an all-wheel-drive drivetrain. The motor vehicle drivetrain 8 comprises a permanently driven first drivetrain part 9 and a second drivetrain part 10 which is connectable in terms of drive by means of a main separating unit 19, such as for example a multiplate clutch, to the first drivetrain part 9.

The arrow 20 illustrated in FIG. 4 indicates the forward direction of travel of the motor vehicle.

In the case of the exemplary motor vehicle drivetrain 8 shown in FIG. 4, a drive unit 21, such as for example an internal combustion engine and/or an electric machine, is arranged, transversely with respect to a longitudinal axis 22 of the motor vehicle, in the front region of the motor vehicle. The drive unit 21 is permanently connected via a main transmission 23 to a front-axle differential 24. The front-axle differential 24 divides a front axle 25 into two front lateral axles 25', 25", wherein in each case one front lateral axle 25', 25" is connected in terms of drive at one end to in each case one output of the front-axle differential 24 and at the respective other end to a front wheel 26, 26'. In this way, the front wheels 26, 26' arranged on the front axle 25 are permanently driven. This subregion of the motor vehicle drivetrain 8 constitutes the first drivetrain part 9 of the motor vehicle drivetrain 8.

In the rear region of the motor vehicle drivetrain 8, there is arranged a rear axle 27 with a rear-axle differential 28 and rear wheels 29, 29'. The rear-axle differential 28 divides a rear axle 27 into two rear lateral axles 27', 27', wherein in each case one rear lateral axle 27', 27' is connected in terms of drive at one end to in each case one output 31, 31' of the rear-axle differential 28 and in each case one rear lateral axle 27, 27' is connected at the other end to in each case one rear wheel 29, 29'. The part of the motor vehicle drivetrain 8 proceeding from an output element of the main separating unit 19 to the rear wheels 29, 29' constitutes substantially the second drivetrain part 10 of the motor vehicle drivetrain 8. The output element of the main separating unit 19 is connected in terms of drive to one end of a torque-transmitting element 30, in this case a cardan shaft. At its other end, the torque-transmitting element 30 is connected in terms of drive to the rear-axle differential 28.

Furthermore, an above-described clutch unit 1 according to the invention is arranged in the region of the second drivetrain part 10. By means of the clutch unit 1, the second drivetrain part 10 of the motor vehicle drivetrain 8 can be selectively partially deactivated—the second drivetrain part 10 of the motor vehicle drivetrain 8 thus comprises a deactivatable part and a non-deactivatable part.

Figure 5:
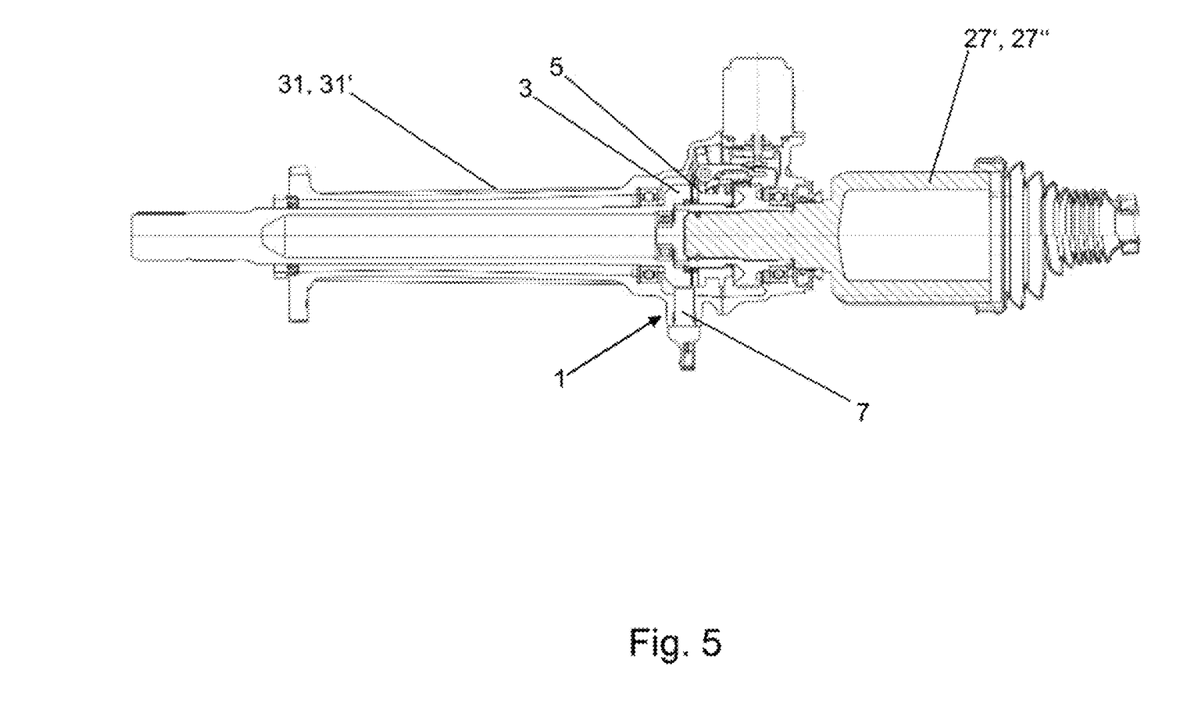
FIG. 5 shows a detail of a motor vehicle drivetrain having a clutch unit.

FIG. 5 illustrates a portion of the second drivetrain part 10 of the exemplary motor vehicle drivetrain 8, more specifically a rear lateral axle 27', 27" of the rear axle 27. The clutch unit 1 according to the invention is, in the present exemplary motor vehicle drivetrain 8, arranged in the region of the rear axle 27 between the respective output 31, 31' of the rear-axle differential 28 and the respective rear lateral axle 27', 27" of the rear axle 27.

The part of the second drivetrain part 10 proceeding from the output element of the main separating unit 19 to the coupling element 3 of the clutch 2 of the clutch unit 1 constitutes the deactivatable part of the second drivetrain part 10 of the motor vehicle drivetrain 8. The part of the second drivetrain part 10 proceeding from the counterpart element 5 of the clutch 2 of the clutch unit 1 to the respective rear wheel 29, 29' constitutes the non-deactivatable part of the second drivetrain part 10 of the motor vehicle drivetrain 8.

If all-wheel drive is not required owing to the driving situation, then the deactivatable part of the second drivetrain part 10 can be deactivated in terms of drive for the purposes of saving energy. Here, the drive-side main separating unit 19 and the clutch 2 of the clutch unit 1 are opened in order to reduce the output-side losses or drag torques. The cardan shaft 30 with attachment parts, as part of the deactivatable part of the second drivetrain part 10, is thus deactivated, and the drive system is, in terms of drive, in the energy-saving 2WD mode with reduced drag losses. If a switch is made back to the 4WD mode proceeding from the 2WD mode, the deactivatable part of the second drivetrain part 10 must be activated and thus prepared for the 4WD mode. Here, it is firstly necessary to establish rotational speed synchronicity between the deactivatable part of the second drivetrain part 10 and the non-deactivatable part of the second drivetrain part 10. The drive required for this purpose is effected by actuation of the main separating unit 19, specifically in the present case by closing a multiplate clutch. Here, torque of the drive unit 21 is transmitted via the main transmission 23 and the main separating unit 19, and thus the torque required for the synchronization of the deactivated deactivatable part of the second drivetrain part 10 is transmitted via the drive-side main separating unit 19 to the cardan shaft 30. The rotational acceleration is performed until there is no longer slippage at the main separating unit 19, specifically the multiplate clutch, and the deactivatable part of the second drivetrain part 10 has thus been accelerated to the synchronous rotational speed. When the synchronous rotational speed has been attained between the respective rear lateral axle 27', 27" and the output 31, 31' of the rear-axle differential 28, the clutch 2 of the clutch unit 1 is closed.

The expression "2WD" stands for "two wheel drive" and describes motor vehicle drive via only one motor vehicle axle, in the example shown in FIG. 4 the rear axle 27 or the front axle 25.

The expression "4WD" stands for "four-wheel-drive" and describes motor vehicle drive via at least two motor vehicle axles, in the example shown in FIG. 4 a rear axle 27 and a front axle 25. The 4WD mode corresponds substantially to all-wheel drive of a motor vehicle.

The sensor unit 7 of the clutch unit 1 is, in terms of measuring technology, used both for the synchronization of the cardan shaft 30 and for the detection of the clutch state of the clutch 2 of the clutch unit 1, and is accordingly distinguished by its multifunctionality with an extremely simple design.

Whereas the determination of the tooth frequency, that is to say the number of >tooth 11, 11'-space 12, 12'< structure transition changes per unit of time, and thus the clutch rotational speed, more specifically the rotational speed of the coupling element 3 and the rotational speed of the counterpart element 5, are of primary significance during the synchronization, it is the different signal form when the clutch 2 is closed in relation to the open clutch 2 that is of crucial significance in the detection of the switching state of the clutch 2. This is based exclusively on the sensor unit 7, which is constructed over the toothing 4 of the static, that is to say axially non-displaceable coupling element 3 of the clutch 2.

When the output 31, 31' of the rear-axle differential 28 is rotating, in the open state of the clutch 2, a structure transition of the sequence >tooth 11-space 12-tooth 11 etc.< is detectable by means of the sensor unit 7 at the coupling element 3, more specifically at the toothing 4 of the coupling element 3. In the closed state of the clutch 2, at the coupling element 3 and the counterpart element 5, more specifically the toothing 4 of the coupling element 3 and the counterpart toothing 6, engaging into the toothing 4 of the coupling element 3, of the counterpart element 5, a structure transition of the sequence >tooth 11-tooth 11'-space 12, 12' possibly reduced depending on tooth clearance-tooth 11-tooth 11' etc.< is detected. The sensor signal 17 to be expected will be so different in the two states that the states are made clearly distinguishable following evaluation of the sensor signals 17, and the intermediate state >tooth 11-tooth 11'< or >space 12-space 12'< can be derived.

Figure 6:
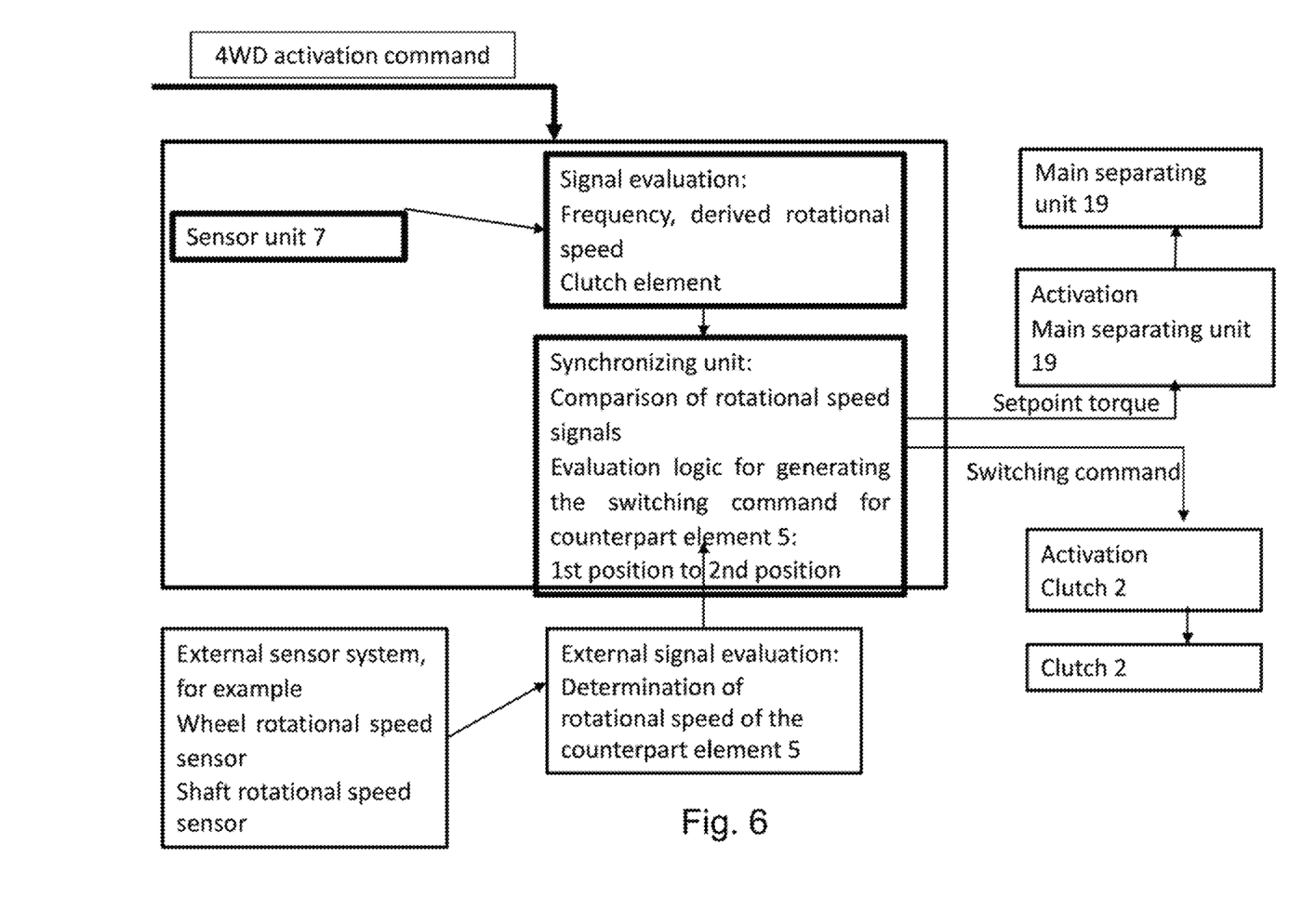
FIG. 6 shows a diagram relating to the activation logic and synchronization logic of a motor vehicle drivetrain having an external sensor system.
Figure 7:
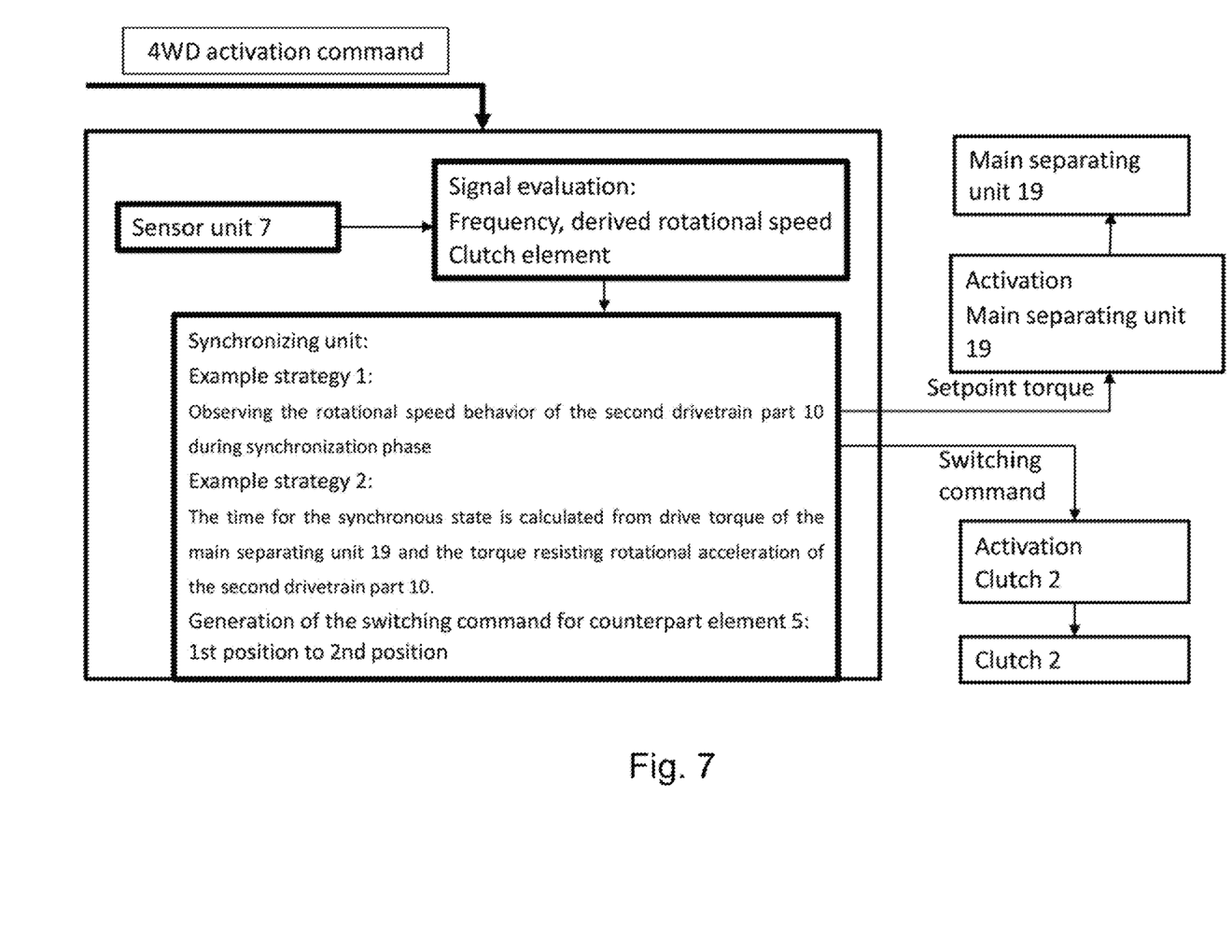
FIG. 7 shows a diagram relating to the activation logic and synchronization logic of a motor vehicle drivetrain without an external sensor system.

FIG. 6 and FIG. 7 each show a diagram relating to the synchronization logic of deactivatable part of the second drivetrain part 10 and non-deactivatable part of the second drivetrain part 10 and relating to the activation logic of the second drivetrain part 10. The control of the synchronization and of the activation is performed for example by means of a control unit.

The expression "synchronicity" describes a state in which the rotational speed of the deactivatable part of the second drivetrain part 10 of the motor vehicle drivetrain 8 and the rotational speed of the non-deactivatable part of the second drivetrain part 10 of the motor vehicle drivetrain 8 are equal or approximately equal.

In the synchronization phase for the closing of the clutch 2 of the clutch unit 1, the tooth frequency of the coupling element 3 is sensed by means of the sensor unit 7, and from this the associated rotational speed of the deactivatable part of the second drivetrain part 10 is derived.

The determination of the synchronicity of deactivatable part of the second drivetrain part and non-deactivatable part of the second drivetrain part may be performed on one hand with the aid of an external sensor system or on the other hand by means of internal activation time determination, that is to say without an external sensor system. The sensor unit 7 serves at all times for determining the rotational speed of the deactivatable part of the second drivetrain part 10 and for determining the position of the counterpart element 5, and thus for determining the state of the clutch 2 of the clutch unit 1.

FIG. 6 shows a diagram relating to the synchronization logic and activation logic with an external sensor system. By means of the determination of the rotational speed of the counterpart element 5 of the clutch 2, the rotational speed of the non-deactivatable part of the second drivetrain part 10 can be inferred. This rotational speed is determined by means of the external sensor system, in this case for example by means of the rear-wheel rotational speed signals determined by means of wheel rotational speed sensors. It is furthermore for example also possible for an external sensor system that detects the shaft rotation speed corresponding to the rotational speed of the counterpart element 5 to be used (FIG. 6).

The sensor unit 7 of the clutch unit 1 outputs the rotational speed of the deactivatable part of the second drivetrain part 10 and the external sensor system outputs the rotational speed of the non-deactivatable part of the second drivetrain part 10.

If the sensor unit 7 of the clutch unit 1 and the external sensor system, in this case the wheel rotational speed sensors in the region of the rear wheel 29, 29', detect rotational speeds which allow synchronicity of the rotational speeds to be inferred, then the counterpart element 5 of the clutch 2 of the clutch unit 1 can be moved from the first position into the second position, and the clutch 2 of the clutch unit 1 can be closed. In the rotating state of the counterpart element 5 of the clutch unit 1, that is to say when the rear lateral axle 27', 27" is rotating, the counterpart element 5 can be moved from the first position into the second position only when the teeth 11' of the counterpart toothing 6 of the counterpart element 5 come to lie exactly over the spaces 12 of the toothing 4 of the coupling element 3 or vice versa. When the motor vehicle is in the traveling state, in the event of synchronicity of coupling element 3 and counterpart element 5, a rotational movement of both elements is realized. If the teeth 11' of the counterpart element 5 initially do not come to lie exactly over the spaces 12 of the coupling element 3, or vice versa, then this state is achieved by means of slight rotational speed differences of the deactivatable part of the second drivetrain part 10 in relation to the non-deactivatable part of the second drivetrain part 10 and thus of the coupling element 3 and of the counterpart element 5, and the switching of the counterpart element 5 from the first position into the second position can be performed.

If the two rotational speeds, that is to say the rotational speed of the coupling element 3 (in the case of closed main separating unit 19) and the rotational speed of the counterpart element 5 assume the same value, synchronicity has been achieved, and the command for closing the clutch 2 of the clutch unit 1 is issued—the counterpart element 5 moves from the first position into the second position. The switching of the clutch 2 of the clutch unit 1 from the second position into the first position is always possible in the load-free state, that is to say in a state without transmission of force when the main separating unit 19 is open.

Closing of the clutch 2 of the clutch unit 1 in the event of non-synchronicity can lead to damage to the coupling element 3 and/or to the counterpart element 5, and must be avoided in all situations.

In the event of a switch from the 2WD mode to the 4WD mode, in the next step, the state of the clutch 2 of the clutch unit 1, that is to say the position of the counterpart element 5 of the clutch 2, is queried—the sensor signal 17 of the sensor unit 7 is then evaluated with regard to this state. If the evaluation yields the presence of the state >clutch 2 closed<, then the deactivatable part of the second drivetrain part 10 is fully activated, and the high torques required for the 4WD mode can be transmitted via the main separating unit 19 and the second drivetrain part 10 of the motor vehicle drivetrain 8.

By means of the sensor unit 7 of the clutch unit 1 and by means of the signals of the external sensor system, a 2WD/4WD detection system is thus formed. Altogether, an increase in the reliability of detection of the respective mode is thus realized, with minimum outlay in terms of measuring technology. The system is thus made very compact and inexpensive, wherein the activation dynamics and comfort can be significantly improved. The sensor unit 7 of the clutch unit 1 forms, with its characteristic as a rotational speed measuring system, a synchronizing unit in conjunction with the external sensor system.

FIG. 7 shows a diagram relating to the synchronization logic and activation logic without an external sensor system—the rotational speed synchronicity between the deactivatable part of the second drivetrain part 10 and the non-deactivatable part of the second drivetrain part 10 is determined without incorporation of an external sensor system. A rotational speed measurement is performed here only by means of the sensor unit 7 of the clutch unit 1 and thus at the deactivatable part of the second drivetrain part 10. The state of synchronicity thus cannot be identified directly by means of a rotational speed comparison as described on the basis of FIG. 6. It is notable that the state of synchronicity can be only estimated in the strategies described below.

On the one hand, synchronicity can be inferred by means of the rotational speed behavior of the deactivatable part of the second drivetrain part 10 during the rotational acceleration. By means of the torque transmitted via the main separating unit 19, the deactivatable part of the second drivetrain part 10 is accelerated intensely. If the synchronous rotational speed is attained between the deactivatable part of the second drivetrain part 10 and the non-deactivatable part of the second drivetrain part 10, the measurable rotational speed changes are only small, and follow the relatively low rotational speed change values of the rear wheels 29, 29' of the motor vehicle. If this state is detected, then the activation of the clutch 2 of the clutch unit 1 can be initiated.

On the other hand, by means of calculations, the time of the rotational acceleration until the synchronous rotational speed is attained can be estimated. By means of the torque transmitted by the main separating unit 19, and the torque that resists the acceleration of the deactivatable part of the second drivetrain part 10, the maximum time required for the drivetrain for the rotational acceleration to the synchronous rotational speed can be determined. Corresponding safety factors which reflect adverse ambient conditions must be taken into consideration, and lengthen the time until synchronicity is attained. After the determined time, synchronicity between the deactivatable part of the second drivetrain part 10 and the non-deactivatable part of the second drivetrain part 10 can be assumed, and the command for closing the dog clutch can be issued.

Furthermore, use may be made of mixed strategies of the synchronization logics and activation logics described in accordance with FIG. 6 and FIG. 7, wherein the logics may be based on a wide variety of different signals which are provided in the vehicle for example via a bus system and from which evaluable information relating to the synchronization can be derived.

LIST OF REFERENCE DESIGNATIONS

1 Clutch unit
2 Clutch
3 Coupling element
4 Toothing
5 Counterpart element
6 Counterpart toothing
7 Sensor unit
8 Motor vehicle drivetrain
9 First drivetrain part
10 Second drivetrain part
11 Tooth (of the toothing)
11' Tooth (of the counterpart toothing)
12 Space (of the toothing)
12' Space (of the counterpart toothing)
13 Tooth flank (of the toothing)
13' Tooth flank (of the counterpart toothing)
14 Longitudinal axis (of the clutch of the clutch unit)
15 Clutch input side
16 Clutch output side
17 Sensor signal
18 Signal pulse
19 Main separating unit (multiplate clutch)
20 Forward direction of travel
21 Drive unit
22 Longitudinal axis (of the motor vehicle)
23 Main transmission
24 Front-axle differential
25 Front axle
25', 25" Front lateral axle
26, 26' Front wheel
27 Rear axle
27', 27" Rear lateral axle
28 Rear-axle differential
29, 29' Rear wheel
30 Torque-transmitting element (cardan shaft)
31, 31' Output (of the rear-axle differential)
32 Period (of the sensor signal)

The invention claimed is:

1. A motor vehicle system comprising:
    a clutch, wherein the clutch has an axially fixed, rotationally movable coupling element with axially extending toothing,
    wherein the clutch further includes an axially displaceable, rotationally movable counterpart element with axially extending counterpart toothing,
    wherein the counterpart element is displaceable into a first position that is disconnected from the coupling element, and is displaceable into a second position that is connected in positively locking fashion to the coupling element;
    a sensor unit axially aligned and radially from the toothing of the axially fixed coupling element so as to register the toothing of the coupling element;
    wherein the sensor unit, both in the first position and in the second position of the axially movable counterpart element, detects a sensor signal by way of which a rotational speed of the coupling element and the first position of the counterpart element, the second position of the counterpart element, or a position of the counterpart element between the first position and the second position can be ascertained;
    a drivetrain including a deactivatable part and a non-deactivatable part, wherein the deactivatable part can be selectively connected in terms of drive to the non-deactivatable part, and wherein the deactivatable part can be selectively at least partially deactivated by way of the clutch; and
    a control unit in operative communication with the sensor unit, the control unit configured to determine a synchronicity between the deactivatable part and the non-deactivatable part;
    wherein the control unit detects, via the sensor, a tooth frequency of the coupling element, wherein the control unit derives a rotational speed of the deactivatable part in response to detecting the tooth frequency of the coupling element; and
    wherein the control unit determines the synchronicity in combination with an internal activation time determination and without an external sensor system.

2. The system of claim 1, wherein the control unit determines a rotational speed of the counterpart element and the control unit infers a rotational speed of the non-deactivatable part based on the rotational speed of the counterpart element.

3. The system of claim 2, wherein the control unit compares the rotational speeds of the deactivatable part and the non-deactivatable part and determines the synchronicity when the rotational speeds of the deactivatable part and the non-deactivatable part correspond.

4. The system of claim 2, wherein the control unit allows movement of the counterpart element from the first position to the second position.

5. The system of claim 4, wherein the control unit determines a four-wheel drive condition when the synchronicity is determined and the counterpart element is in the second position.

6. The system of claim 1, wherein the deactivatable part and the non-deactivatable part are part of a rear drivetrain.

7. The system of claim 6, wherein the deactivatable part rotates along with rotation of rear wheels.

8. A motor vehicle system comprising:

a clutch, wherein the clutch has an axially fixed, rotationally movable coupling element with axially extending toothing, wherein the clutch further includes an axially displaceable, rotationally movable counterpart element with axially extending counterpart toothing, wherein the counterpart element is displaceable into a first position that is disconnected from the coupling element, and is displaceable into a second position that is connected in positively locking fashion to the coupling element;

a sensor unit axially aligned and radially from the toothing of the axially fixed coupling element so as to register the toothing of the coupling element;

wherein the sensor unit, both in the first position and in the second position of the axially movable counterpart element, detects a sensor signal by way of which a rotational speed of the coupling element and the first position of the counterpart element, the second position of the counterpart element, or a position of the counterpart element between the first position and the second position can be ascertained;

a drivetrain including a deactivatable part and a non-deactivatable part, wherein the deactivatable part can be selectively connected in terms of drive to the non-deactivatable part, and wherein the deactivatable part can be selectively at least partially deactivated by way of the clutch; and a control unit in operative communication with the sensor unit, the control unit configured to determine a synchronicity between the deactivatable part and the non-deactivatable part;

wherein the control unit detects, via the sensor, a tooth frequency of the coupling element, wherein the control unit derives a rotational speed of the deactivatable part in response to detecting the tooth frequency of the coupling element;

wherein the control unit determines the synchronicity in combination with signals received from an external sensor system; and wherein the external sensor system comprises wheel speed sensors.

9. The system of claim 8, wherein the deactivatable part and the non-deactivatable part are part of a rear drivetrain.

10. The system of claim 9, wherein the deactivatable part rotates along with rotation of rear wheels.

11. The system of claim 8, wherein the control unit determines a rotational speed of the counterpart element and the control unit infers a rotational speed of the non-deactivatable part based on the rotational speed of the counterpart element.

12. The system of claim 11, wherein the control unit compares the rotational speeds of the deactivatable part and the non-deactivatable part and determines the synchronicity when the rotational speeds of the deactivatable part and the non-deactivatable part correspond.

13. The system of claim 11, wherein the control unit allows movement of the counterpart element from the first position to the second position.

14. The system of claim 13, wherein the control unit determines a four-wheel drive condition when the synchronicity is determined and the counterpart element is in the second position.

* * * * *